United States Patent [19]
Krichtafovitch et al.

[11] Patent Number: 5,629,844
[45] Date of Patent: May 13, 1997

[54] HIGH VOLTAGE POWER SUPPLY HAVING MULTIPLE HIGH VOLTAGE GENERATORS

[75] Inventors: Igor A. Krichtafovitch, Kirkland; Irina Z. Sinitsyna, Bothell, both of Wash.

[73] Assignee: International Power Group, Inc., Woodinville, Wash.

[21] Appl. No.: 416,997

[22] Filed: Apr. 5, 1995

[51] Int. Cl.$^6$ ................................................ H02M 3/335
[52] U.S. Cl. .................. 363/65; 363/15; 363/95
[58] Field of Search ............................. 363/15, 17, 65, 363/71, 95, 98

[56] References Cited

U.S. PATENT DOCUMENTS

| | | | |
|---|---|---|---|
| 3,818,307 | 6/1974 | Hamilton et al. | |
| 4,399,392 | 8/1983 | Buhrer | 315/308 |
| 4,413,225 | 11/1983 | Donig et al. | 323/246 |
| 4,455,598 | 6/1984 | Andre | 363/87 |
| 4,599,685 | 7/1986 | Hombu et al. | 363/41 |
| 4,601,051 | 7/1986 | Santurtûn et al. | 378/118 |
| 4,662,343 | 5/1987 | Smith | 123/605 |
| 4,761,725 | 8/1988 | Henze | 363/46 |
| 4,782,242 | 11/1988 | Kovacs | 307/106 |
| 4,818,892 | 4/1989 | Oohashi et al. | 307/106 |
| 4,914,356 | 4/1990 | Cockram | 315/307 |
| 4,933,825 | 6/1990 | Allington et al. | 363/16 |
| 4,999,547 | 3/1991 | Ottenstein | 315/307 |
| 4,999,760 | 3/1991 | Tietema | 363/65 |
| 5,128,593 | 7/1992 | Gilbert | 315/287 |
| 5,200,645 | 4/1993 | Laeuffer | 363/71 |
| 5,267,136 | 11/1993 | Suga et al. | 363/65 |
| 5,272,612 | 12/1993 | Harada et al. | 363/65 |

FOREIGN PATENT DOCUMENTS

| | | | |
|---|---|---|---|
| 044488A1 | 1/1982 | European Pat. Off. | |
| 0552389A1 | 1/1992 | European Pat. Off. | B03C 3/68 |
| 480796A1 | 4/1992 | European Pat. Off. | |
| WO92/03898 | 3/1992 | WIPO | H05B 39/04 |

*Primary Examiner*—Jeffrey L. Sterrett
*Attorney, Agent, or Firm*—Christensen, O'Connor, Johnson & Kindness PLLC

[57] ABSTRACT

A high voltage power supply (40) having a plurality of high voltage generators (50a, 50b, ... 50j) that produce a controlled current in a load (24) having a capacitive component. Each high voltage generator consists of a pulsewidth-modulated (PWM) inverter, a high voltage transformer, and a high voltage full bridge rectifier. The high voltage generators are divided into three groups: Group I, Group II, and Group III. During a driving mode of power supply operation, the Group I, Group II, and Group III high voltage generators produce an output voltage ($V_{gen}$) from the power supply which exceeds a voltage ($V_c$) across the capacitive component of the load, causing the current in the load to increase. When the current in the load reaches a desired value, the power supply enters a tracking mode of operation. During the tracking mode, the Group I and Group II high voltage generators produce an output voltage ($V_{gen}$) from the power supply which equals the voltage ($V_c$) across the capacitive component of the load. The current through the load remains constant while the power supply tracks the voltage across the capacitive component of the load. The driving mode and the tracking mode are repeatedly performed, as the high voltage generators are driven by a square wave voltage ($V_{sw}$) produced by a timing generator (66). A control circuit (56) is also provided in the power supply to enable or disable additional Group II high voltage generators in response to fluctuations in the voltage across the load.

23 Claims, 9 Drawing Sheets

HIGH VOLTAGE POWER SUPPLY HAVING MULTIPLE HIGH VOLTAGE GENERATORS

FIELD OF THE INVENTION

The present invention relates generally to high voltage power supplies and, in particular, to a high voltage power supply for generating a controlled current in a load having varying inductive and capacitive components.

BACKGROUND OF THE INVENTION

High voltage power supplies often are used in applications where a load connected to the power supply includes a significant inductive or capacitive component. In many applications, inductive components comprise a major component of the load. For example, electrostatic precipitators contain electrode arrays connected to a high voltage power supply via high voltage cables and buses. The array, the cables, and the buses all contribute to the overall inductive value of the system. Even in applications that do not contain large inductive components, elements of the system may have non-negligible inductive values. For example, a load connected to a high voltage power supply may be connected to the power supply by a high voltage cable having an inherent inductance. As a general rule, therefore, all high-power electrical circuits can be modeled with resistive, inductive, and capacitive components.

The presence of capacitive and inductive load components often makes it difficult to maintain a desired current in the load because the components prevent the current in a load from quickly changing. This is a disadvantage because in many applications, it is beneficial to maintain the current in a high power circuit at a desired level. A constant current allows the transfer of a maximum amount of electrical energy in a minimum time. A limited amplitude also increases the safety of those exposed to the circuit. Finally, a limited amplitude is ideal for power supplies constructed of power transistors. Since power transistors are rated to handle a maximum current, transistors used in power supplies that generate current waveforms that may periodically exceed an average current level must be selected to handle the periodic spikes to a much higher current level. If the amplitude of a load current is controlled to remain around an average level, typically less expensive power transistors having a lower current carrying capability may be selected for use in the power supply.

Several different approaches exist for designing a power supply that produces a direct current (DC) high voltage. For example, a common approach is to convert a DC voltage to a high frequency alternating current (AC) square wave voltage with an inverter, step-up the square wave voltage using a high voltage transformer, and rectify the stepped-up output of the transformer to produce an approximately DC output voltage. A drawback to this generation method is that it does not allow simple control of the magnitude and waveform of the current generated in the transformer and in the load. The magnitude of the current in the load is affected by two changing voltages. First, fluctuations in the primary DC voltage source can cause the amplitude of the AC square wave voltage from the inverter to vary. Variance in the output from the inverter will have a direct effect on the output voltage from the power supply. Second, changes in the voltage drop across the inductive or capacitive components in the load will affect the current through the load if the output voltage from the power supply remains constant. For example, in precipitator applications, the voltage drop across the electrode array in the precipitator will fluctuate in response to varying amounts of pollutants passing through the precipitator. The two changing voltages, i.e., the magnitude of the output voltage generated by the high voltage power supply (hereinafter $V_{gen}$) and the voltage across the capacitive components in the load (hereinafter $V_c$), often change independently of each other. The variation of both $V_{gen}$ and $V_c$ effects the rate of change of current in the load. Because prior art power supplies were not successful in rapidly controlling the difference between the output voltage from the power supply and the voltage in the load, the magnitude and waveform of the current in the supply and load often went uncontrolled.

Generating a controlled current in an electrical circuit that includes inductive and capacitive components is therefore a difficult problem. Several solutions have been suggested, all of which limit the switching speed of the power supply. For example, one solution is to convert the unstable DC input voltage to a stable current by adding a current regulator or limiter to the output of the power supply. While an added regulator will limit the output current from the high voltage power supply, a current regulator also contains reactive elements which store energy. When the power supply is turned off, the stored energy must dissipate through other components, preventing the output of the supply from rapidly decreasing to zero. Those techniques which allow the production of a regulated current from a high voltage power supply therefore have a tendency to prevent the rapid shut down of the power supply. It is an object of the present invention to create a power supply that produces a regulated current in a load and allows rapid power down.

SUMMARY OF THE INVENTION

A high voltage power supply is disclosed having a plurality of high voltage generators that may be divided into three groups, hereinafter referred to as Groups I, II, and III. Each of the high voltage generators comprises a pulsewidth-modulated (PWM) inverter, a high voltage transformer, and a high voltage full bridge rectifier. In operation, the PWM inverter generates a high frequency AC voltage that is stepped-up by the transformer and rectified by the rectifier. The output voltage (hereinafter $V_{gen}$) generated by the power supply is equivalent to the sum of the output voltages from each of the three groups of high voltage generators. The output voltage may be applied to a load having varying inductive, capacitive, and resistive elements. A voltage (hereinafter $V_c$) is produced in the load across the capacitive components.

Each of the groups of high voltage generators contributes a different component to the output voltage produced by the power supply. The power supply cycles through two modes of operation to maintain a desired current in the load. During a driving mode, Groups I, II, and III of the high voltage generators collectively provide an output voltage that exceeds the voltage across the capacitive components in the load. To accomplish this objective, Group I generates a tracking voltage ($V_1$) that decreases as the current rises in the load, Group II generates a base voltage ($V_2$) approximating the voltage across the load, and Group II generates an accelerator voltage ($V_3$) at a level that ensures that the sum of the three voltages exceeds the voltage across the load (i.e., $V_1+V_2+V_3>V_c$). During the driving mode the rate of the change of the current in the load and in the high voltage generator transformers is at a maximum value.

Operation in the tracking mode begins when the current in the load reaches a desired level. During the tracking mode, Groups I and II of the high voltage generators operate to collectively provide an output voltage that is equal to the voltage across the capacitive components in the load. The Group II component of the output voltage is a substantially constant base voltage ($V_2$), which is equal to or less than the voltage across the load. The Group I high voltage generator produces a tracking voltage ($V_1$) equal to the difference between the voltage provided by the Group II high voltage generators and the voltage appearing across the capacitive components (i.e., $V_1+V_2=V_c$). Because the output voltage from the power supply tracks the voltage across the capacitive component in the load, the current in the load and in the high voltage generator transformers remains constant during the tracking mode.

To expand the range of the power supply, a control circuit is provided to enable or disable additional high voltage generators contained in Group II. In order to track a voltage change across the capacitive components in the load, the high voltage produced by the Group II generators must be capable of producing a broad range of output voltages. To produce these voltages, additional high voltage generators may be turned on-or-off by the control circuit to adjust the output of the power supply. The generators are dynamically enabled or removed in response to changes in the voltage across the load.

It will be appreciated that the power supply disclosed herein offers several advantages over other high voltage power supplies disclosed in the prior art. In particular, the present power supply generates a high voltage while controlling the magnitude and waveform of the current in the load and the transformers. The current may be controlled despite fluctuations in the difference between the primary voltage and the voltage across the capacitive components in the load.

Additionally, the number of high voltage generators that are included in each power supply may be selected based on the desired operating range of the power supply. More or less Group II generators may be included to alter the base voltage level applied by the power supply in the driving mode and the tracking mode. The use of a modular design therefore increases the applications and flexibility of the power supply.

A still further advantage is that very few energy storage components are included in the power supply design. The minimal use of inductors or capacitors allows the high voltage power supply of the present invention to be quickly turned on-or-off. The rapid response of the power supply allows it to be used in situations where it would be desirable to quickly turn off the power during the occurrence of a failure condition, such as a short in the load. The rapid switching time of the power supply disclosed herein therefore makes it a especially suited for applications such as electrostatic precipitators, x-ray equipment, pulse and continuous lasers, and radar systems.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
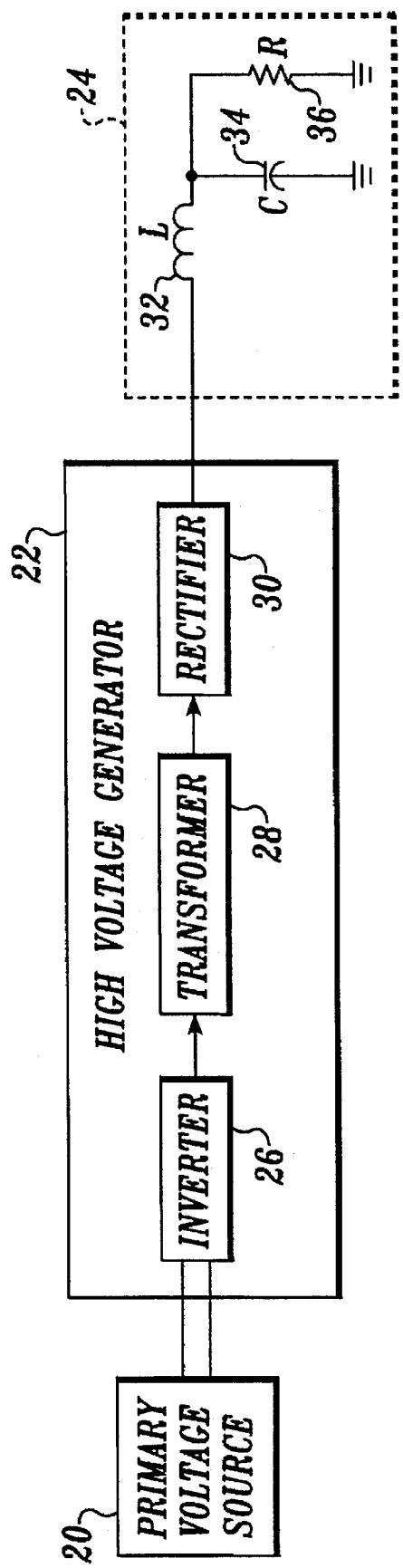
FIG. 1 is a block diagram of a prior art high voltage power supply coupled to a load having a capacitive, an inductive, and a resistive component.

A high voltage power supply design that is known in the art is represented in the block diagram of FIG. 1. The power supply consists of a primary DC voltage source 20 that provides an unregulated DC voltage to a high voltage generator 22. The high voltage generator is connected to a load 24, and contains an inverter 26, a transformer 28, and a rectifier 30 to produce a high voltage for application to the load. Inverter 26 converts the unregulated DC voltage from the primary voltage source into a high frequency square wave. The high frequency square wave is stepped-up by high voltage transformer 28 and rectified by high voltage rectifier 30. The resulting output voltage applied to the load is a fully rectified square wave having a nearly constant DC amplitude.

The current flowing in the load depends on the voltage generated and applied to the load by high voltage generator 22. Load 24 may be modeled with three components: an inductive component 32, a capacitive component 34, and a resistive component 36. The current produced in the inductive component when a voltage is applied by the high voltage generator may be represented by the following equation:

$$\frac{V_{gen} - V_c}{L} = \frac{di}{dt} \quad (1)$$

Where:
$V_{gen}$=voltage generated by high voltage generator 22;
$V_c$=voltage across capacitive component 34;
i=current through inductive component 32;
L=equivalent value of inductive component 32; and
di/dt=the rate of change of current in the inductive component.

From equation (1) it is apparent that the rate of change of the current in the load depends on the difference between $V_{gen}$ and $V_c$. Several factors can cause these voltages to fluctuate. With respect to $V_{gen}$, the output voltage from the high voltage generator is proportional to the magnitude of the voltage produced by primary voltage source 20. Fluctuations in the primary voltage supply due to instability or voltage ripples directly cause variations in the output voltage $V_{gen}$. In contrast, $V_c$ can change its magnitude due to a change in the voltage drop across the inductive component in the load. The voltage drop across the inductive component may change due to the discharge of energy, for example, during precipitator operation. As $V_{gen}$ and $V_c$ change, the difference between the voltages typically changes, causing a proportional current fluctuation through the inductive component of the load. In general, large fluctuations in load currents are to be avoided, as they have the potential to overheat or destroy electric components in the load.

The object of the present invention is to maintain the magnitude of the current in the load at a desired level independently of any fluctuations in the primary voltage and changes in voltage across the capacitive components.

1. General Power Supply Construction and Operation

Figure 2:
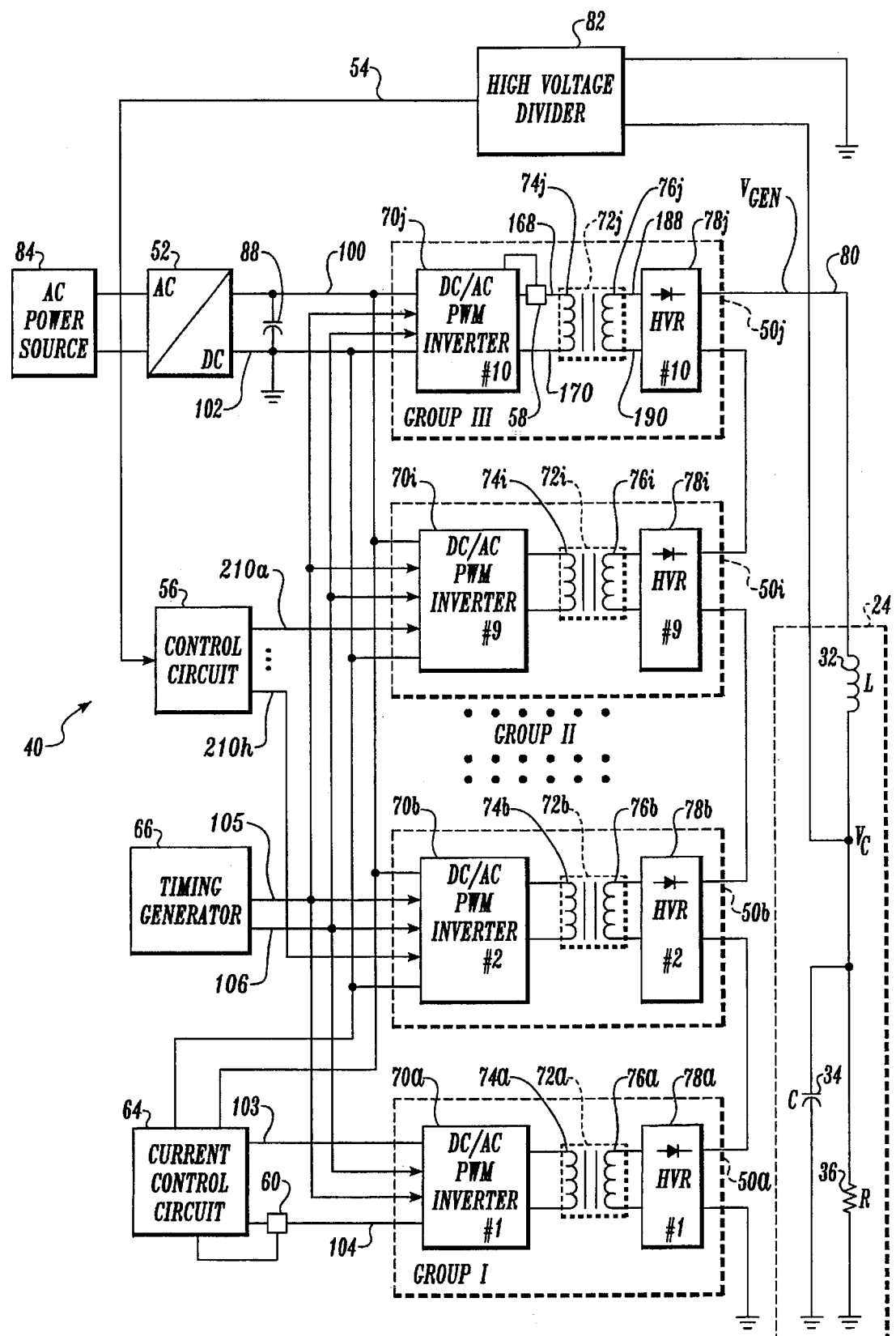
FIG. 2 is a block diagram of a high voltage power supply having a plurality of high voltage generators formed in accordance with the present invention.

A block diagram of a high voltage power supply 40 constructed according to the present invention is shown in FIG. 2. High voltage power supply 40 consists of three sets of high voltage generators 50 identified as Groups I, II, and III. In a preferred embodiment of the power supply, Group I consists of a single high voltage generator 50a, Group II is made up of eight high voltage generators 50b, 50c, ... 50i, and Group III is formed by a single high voltage generator 50j. Upon understanding the invention, it will be appreciated that greater or fewer high voltage generators may be included in each group so as to configure the invention for operation at a desired voltage and current level.

A single-phase AC power source 84 provides power to the high voltage power supply. In a preferred embodiment of the high voltage power supply, AC power source 84 provides a 120 volt AC voltage at 60 Hz. The AC power source supplies operating power to an unregulated AC-to-DC rectifier 52 which is connected via lines 100 and 102 to each of the high voltage generators 50b, 50c, ... 50j. Connected between lines 100 and 102 is a filter capacitor 88. AC power source 84 also provides operating power to a current control circuit 64 that is coupled to high voltage generator 50a. In the currently preferred embodiment, rectifier 52 is a full-bridge diode network that produces an unregulated DC voltage. In a realization of such an embodiment, the DC voltage produced by the rectifier is approximately 170 volts.

Each high voltage generator 50a, 50b, 50j is comprised of a high voltage inverter 70a, 70b, ... 70j, a high voltage transformer 72a, 72b, ... 72j, and a high voltage rectifier 78a, 78b, ... 78j. As shown in FIG. 2, the output of each inverter 70a, 70b, ... 70j is connected to supply a signal to a corresponding primary winding 74a, 74b, ... 74j of transformer 72a, 72b, ... 72j. An associated high voltage rectifier 78a, 78b, ... 78j is connected to the secondary winding 76a, 76b, ... 76j of each transformer. The high voltage generators are connected in a cascode configuration so that the output voltage $V_{gen}$ from the power supply is the sum of the output voltages produced by each of the high voltage generators. That is, each group in the high voltage power supply produces an output voltage that is summed to form $V_{gen}$.

The high voltage power supply is connected by a line 80 to a load 24. Load 24 may be modeled by an inductive component 32, a capacitive component 34, and a resistive component 36. When current flows through inductive component 32, a voltage $V_c$ is produced across the capacitive component of the load. As discussed above, voltage $V_c$ will vary as a result of changes in the voltage drop across inductive component 32. A change in $V_c$ caused by, for example, energy discharge, would typically result in a change in load current. As will be demonstrated below, however, the power supply disclosed herein generates a variable output voltage that maintains a nearly constant load current of desired amplitude through the inductive component of the load.

Figure 3:
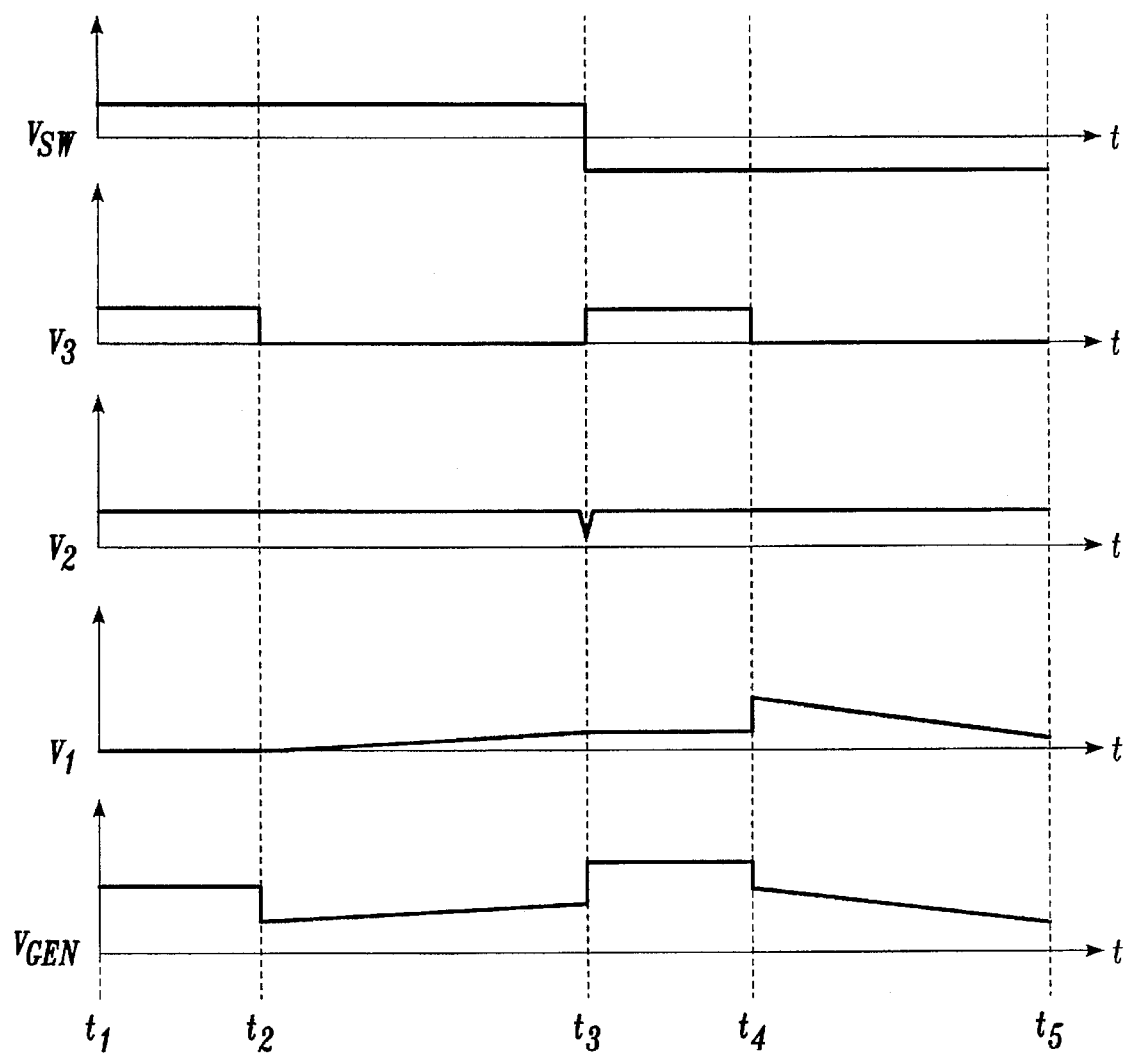
FIG. 3 is a timing diagram showing various voltages generated during operation of the high voltage power supply of FIG. 2.

As noted earlier, each of the generator groups is responsible for generating a different component of the output voltage from the power supply. Representative timing diagrams of the output voltages produced by Groups I, II, and III of the power supply are provided in FIG. 3, and will be discussed generally below. It will be appreciated that the graphs showing the output voltage from each high voltage generator group are idealized in FIG. 3. For example, the voltage transitions of the inverters will be dampened somewhat by the load of the high voltage transformer and high voltage rectifier. The waveforms shown in FIG. 3 are thus to be considered as representative of the shape of the high voltage generator output voltages that produce a desired current ($I_d$) in the load. The specific construction of each high voltage generator group will be subsequently discussed with respect to FIGS. 6, 7, 8, and 9.

In FIG. 2, each of the high voltage generators is connected to a timing generator 66. The timing generator is provided to synchronously drive each of the inverters in the high voltage generators with a high frequency timing signal. In a preferred embodiment of the invention, the timing signal produced by the timing generator is a square wave voltage having an amplitude of 15 volts and a frequency within the range of 10 to 20 kHz. A representative square wave timing signal generated by the timing generator is shown by graph $V_{sw}$ of FIG. 3. As shown in FIG. 3, each of the generator groups generates a characteristic output voltage beginning with the leading or falling edge of the square wave.

The Group III high voltage generator 50j generates a periodic rectangular pulse as shown in graph $V_3$ of FIG. 3. The rectangular pulse begins with the leading edge of the timing signal, and has an amplitude that corresponds to the magnitude of the DC voltage provided by AC-to-DC rectifier 52 and the turns ratio of transformer 72j. A current monitor 58, connected between the output of inverter 70j and the primary winding 74j of transformer 72j, senses the current being delivered by the inverter. When the current measured by current monitor 58 corresponds to a desired load current ($I_d$) through inductive component 32, the inverter of the Group III high voltage generator is switched off. When switched off, the output voltage generated by the Group III generator falls to zero.

The Group II high voltage generators 50b, 50c, ... 50i of FIG. 2 supply an approximately DC output voltage as shown in graph $V_2$ of FIG. 3. That is, each Group II inverter 70b, 70c, ... 70i produces a square wave output that is synchronous with the timing signal produced by timing generator 66. The square wave voltage produced by each inverter is stepped-up by the associated transformer and is full wave rectified by the corresponding high voltage rectifier. In the arrangement of FIG. 2, the output voltage collectively produced by the Group II generators is determined by a control circuit 56 that selectively enables high voltage generators 50b, 50c, ... 50i. Control circuit 56 receives from a voltage divider network 82 on a line 54 a voltage representative of the voltage $V_c$ across the capacitive component of the load. The control circuit monitors the voltage across the load, and enables or disables the high voltage generators so that the total voltage generated by the Group II generators is less than or equal to the voltage appearing across the capacitive component of the load. The output voltage from the Group II generators may therefore change in incremental steps that correspond to the output voltage produced by each high voltage generator in the group.

The Group I high voltage generator 50a produces an output voltage $V_1$ that can range between zero and a value limited by the maximum input voltage being supplied to current control circuit 64. The Group I high voltage generator is connected to a current control circuit 64. Unlike the Group II and Group III high voltage generators, the Group I high voltage generator is a current fed inverter. Connected between the current control circuit 64 and the inverter 70a is a current monitor 60. Current monitor 60 monitors the mount of current flowing in the inverter. The monitored current is a scaled amount of the current flowing through the secondary winding of the transformer contained in the high voltage generator, and therefore proportional to the current flowing through the power supply and to the load. If the current measured by the current monitor 60 indicates a current level in the load below the desired current $I_d$, the current control circuit 64 provides additional current to the inverter 70a to increase the voltage generated by the high voltage generator. Conversely, if the current measured by the current monitor 60 indicates a current in the load greater than the desired current $I_d$, the output voltage from high voltage generator 50a is reduced. In this manner, a variable voltage is generated by the Group I high voltage generator in order to track the change in the voltage across the capacitive component and maintain the current in the load at a desired level. A representative output voltage generated by the Group I generator is shown in graph $V_1$ of FIG. 3.

As each group of high voltage generators produces the above described output voltage, the power supply cycles through two modes of operation, hereinafter referred to as a driving mode and a tracking mode. During a driving mode, represented by the time interval from $t_1$ to $t_2$ in FIG. 3, the sum of the Group I, Group II, and Group III generators exceeds the voltage $V_c$ measured across the capacitive component of the load. The Group I generator produces a high voltage that will dynamically vary during the driving mode. The Group II generators produce a substantially constant output voltage comprising a rectified square wave voltage and the Group III generator produces a positive rectangular pulse. The amplitude of $V_2$ and $V_3$ are selected so that the sum of $V_2$ and $V_3$ is a constant voltage that exceeds $V_c$ (i.e., $V_2+V_3>V_c$). Since $V_{gen}$ is greater than $V_c$ during the driving mode, according to equation (1) the rate of change of current is positive during the period from $t_1$ to $t_2$. The current through the load therefore increases during the driving mode until it reaches a desired level $I_d$. When the current reaches a desired level, current monitor 58 senses the desired current and switches off the Group III inverter 70j. At this point, the power supply enters a tracking mode of operation.

When the desired current level is reached, the power supply enters a tracking mode of operation represented by the time interval from $t_2$ to $t_3$ in FIG. 3. During the tracking mode of operation, the voltage $V_{gen}$ generated by the power supply substantially tracks the voltage $V_c$ across the capacitive component of the load. In particular, the output from the high voltage generator in Group III is switched off by the feedback provided by current monitor 58. The voltage $V_{gen}$ therefore drops to the level of the sum of the output from the Group I and Group II high voltage generators. The Group II generators collectively generate a sum DC voltage less than or equal to the voltage across the load. Simultaneously, the high voltage generator in Group I is controlled so that the sum of the voltages $V_1$ and $V_2$ is substantially equal to the voltage $V_c$ across the capacitive component of the load (i.e., $V_1+V_2=V_c$). As previously pointed out, by monitoring the current being provided to the load, current monitor 60 causes the Group I generator to increase or decrease its output voltage to track voltage changes across the capacitive component in the load. Voltage $V_c$ may change for a variety of reasons, for example, due to any charging or discharging processes in the load. Absent the invention, any such change in $V_c$ would cause a change in load current. However, during the tracking mode, the power supply disclosed herein maintains voltage $V_{gen}$ at a level substantially equal to $V_c$. Thus, in accordance with equation (1), the current in the load does not appreciably change its magnitude during the tracking mode because the voltage drop across the inductive component of the load is in the ideal sense equal to zero. By controlling the output voltage during the driving mode and the tracking mode it is possible to generate a nearly constant current having minimal ripple in the load. Additionally, a nearly square wave current is maintained in the transformers, which is beneficial from the energy transfer standpoint.

The two-mode voltage generation process repeats during the second half of the period of square wave voltage $V_{sw}$ produced by timing generator 66. At time $t_3$, the polarity of the square wave voltage reverses, and a negative voltage drives the high voltage generators. The change in polarity of the voltage driving the high voltage generators causes a momentary drop in the output voltage $V_{gen}$ of the high voltage power supply. This causes $V_c$ to exceed $V_{gen}$, and generates a falling current in the load since, in accordance with equation (1), the change in the current through the inductor is negative.

During the driving mode from $t_3$ to $t_4$, the application of the rectified sum of $V_1$, $V_2$, and $V_3$ causes $V_{gen}$ to exceed $V_c$, and the current to increase through the inductive component in the load. At time $t_4$, the current through the inductor reaches the desired value. When the desired current is reached, the power supply of FIG. 2 begins operation in the tracking mode. The output from the high voltage generator in Group III is switched off, and the voltage $V_{gen}$ drops to the level of $V_2$, the output from the Group II high voltage generators. At the same time, the high voltage generator in Group I changes its output so that the sum of $V_2$ and $V_1$ are equivalent to the voltage $V_c$ across the capacitive load. Driving mode operation begins again at $t_5$ in FIG. 3, i.e., at the end of the negative polarity portion of the square wave timing signal.

Figure 4:
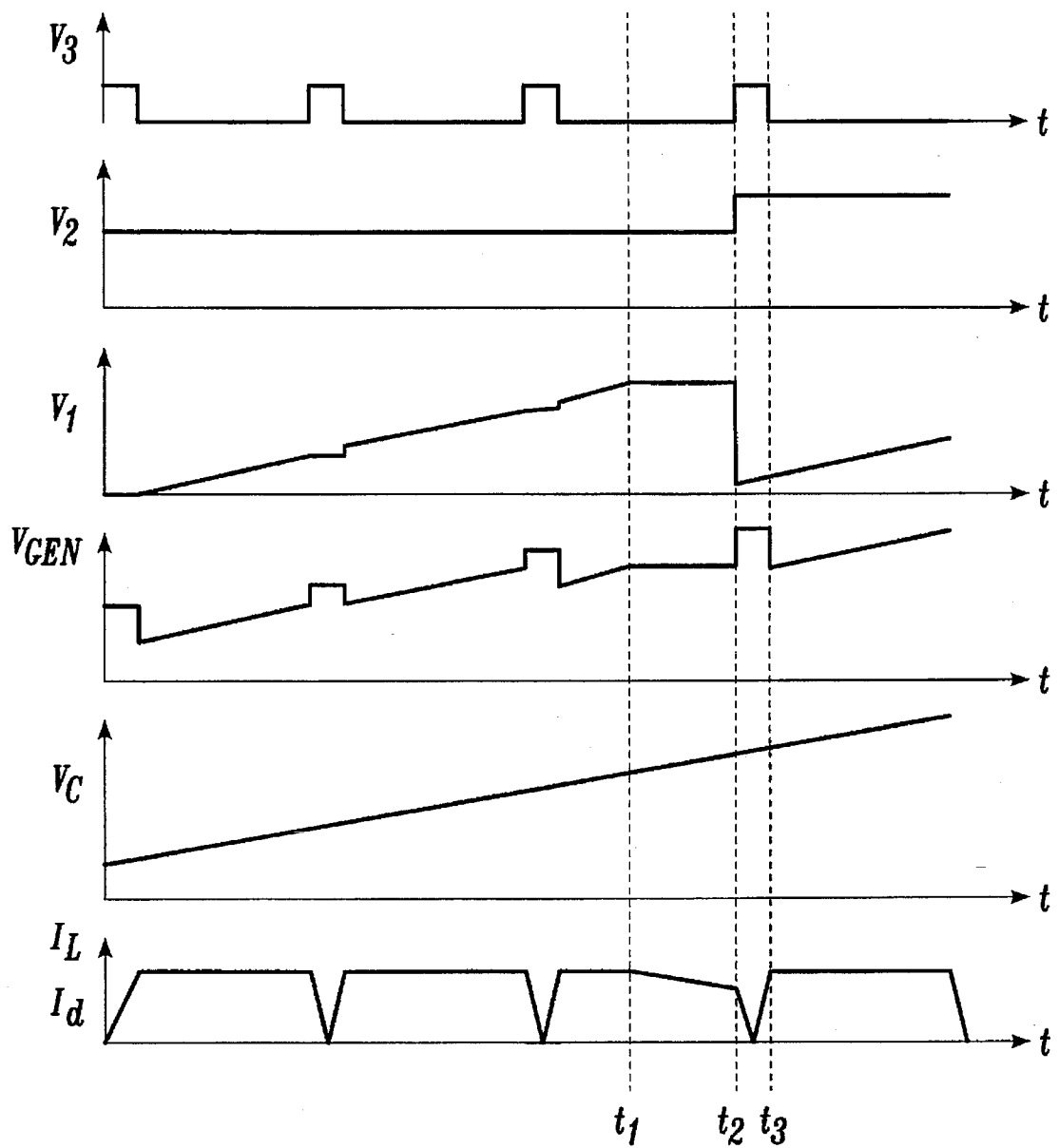
FIG. 4 is a timing diagram showing various voltages generated during operation of the high voltage power supply of FIG. 2 when a voltage across the capacitive component in a load is increasing.
Figure 5:
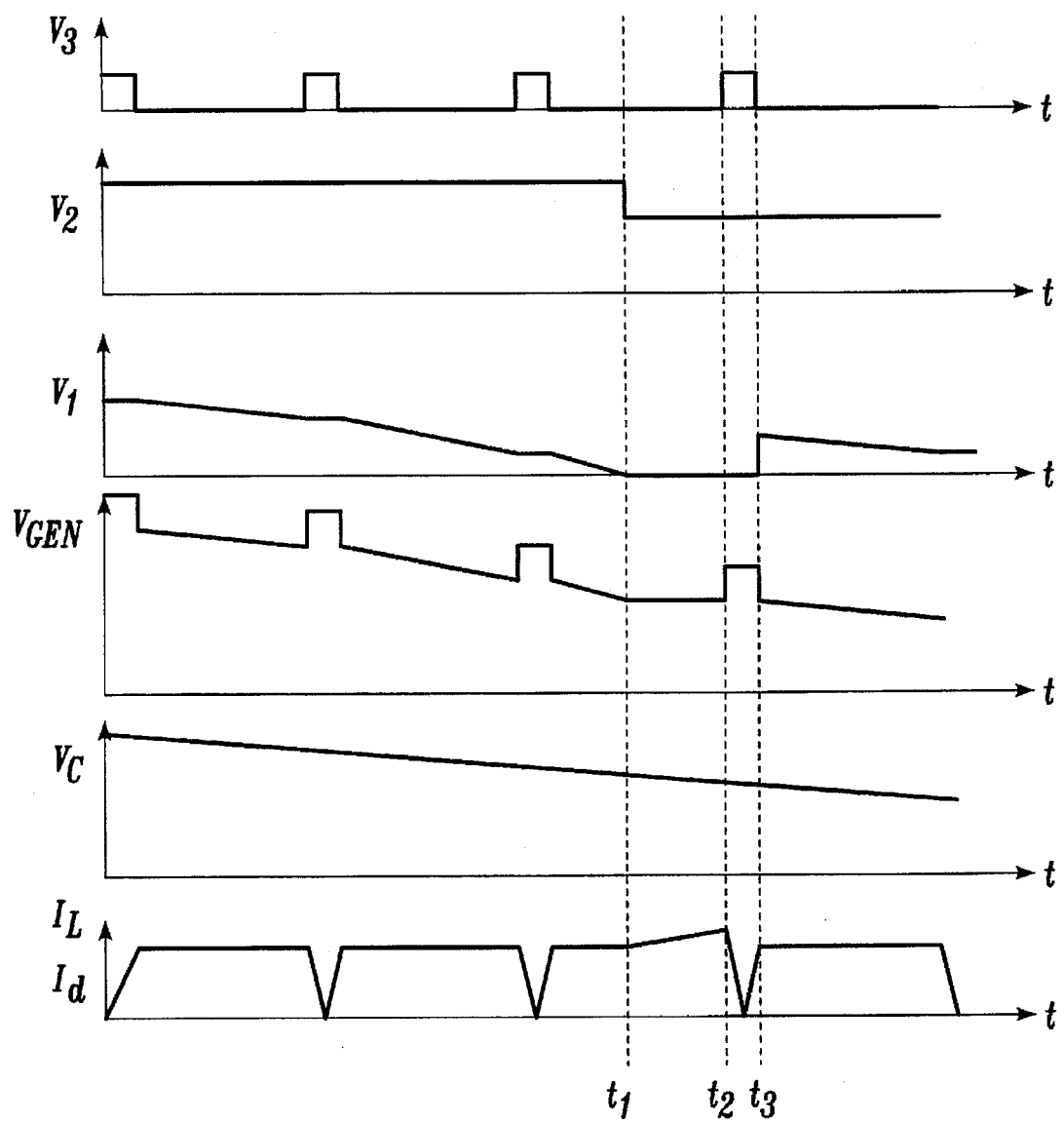
FIG. 5 is a timing diagram showing various voltages generated during operation of the high voltage power supply of FIG. 2 when a voltage across the capacitive component in a load is decreasing.

FIGS. 4 and 5 are timing diagrams showing the effect of a change in the voltage across the capacitive components $V_c$ that will result in enabling or disabling a Group II high voltage generator. Recall from FIG. 2 that the Group II output voltage $V_2$ is produced by a plurality of generators 50b, 50c, ... 52i. The number of Group II generators that are producing a voltage is controlled by control circuit 56, which can selectively enable or disable the output from each of the Group II generators. FIG. 4 represents a case when the voltage $V_c$ across the capacitive component in the load is increasing. As the voltage increases, the output voltage $V_1$ produced by the Group I high voltage generator continues to increase in magnitude to insure that $V_{gen}$ tracks $V_c$. At a time $t_1$, the voltage produced by the Group I high voltage generator reaches a maximum dictated by the input voltage to the current control circuit. From time $t_1$ to time $t_2$, the output voltage $V_1$ remains at a maximum. Because $V_c$ continues to increase during this period, however, $V_c$ becomes greater than $V_{gen}$, causing the current $I_L$ through the load to drop. Recognizing that the high voltage power supply output voltage can no longer track $V_c$, the control circuit in the power supply enables an additional generator in the Group II high voltage generators. The additional generator in Group II increases the output voltage $V_2$ produced by the Group II generators, thus increasing the output voltage $V_{gen}$. By time $t_3$, the output voltage produced by Group I and Group II generators is sufficient to again track $V_c$ without causing $V_1$ to saturate. Current $I_L$ through the load is therefore returned to the desired amplitude and waveform after time $t_3$.

Similarly, FIG. 5 represents a case when the voltage across the capacitive component in the load is decreasing. As the voltage $V_c$ decreases, the output voltage $V_1$ produced by the Group I high voltage generator continues to decrease in magnitude to insure that $V_{gen}$ tracks $V_c$. At a time $t_1$, the voltage produced by the Group I high voltage generator reaches a minimum value (substantially equal to zero) wherein it is not producing any component of $V_{gen}$. From time $t_1$ to time $t_2$, the output voltage $V_1$ remains at zero. Because $V_c$ continues to decrease during this period, however, $V_c$ becomes less than $V_{gen}$, causing the current $I_L$ through the load to increase. Recognizing that the high voltage power supply output voltage can no longer track $V_c$, the control circuit in the power supply disables a generator in the Group II high voltage generators. Eliminating a generator in Group II decreases the output voltage $V_2$ produced by the Group II generators, thus decreasing the output voltage $V_{gen}$. At time $t_3$, the output voltage produced by the Group I and Group II generators is sufficient to again track $V_c$ without forcing $V_1$ to zero. Current $I_L$ through the load is therefore returned to the desired amplitude and waveform after time $t_3$.

Having described the general operation of the disclosed high voltage power supply, more detailed circuit diagrams of the components in the preferred embodiment of the power supply will be described relative to FIGS. 6, 7, 8, and 9.

2. Group III High Voltage Generator

Figure 6:
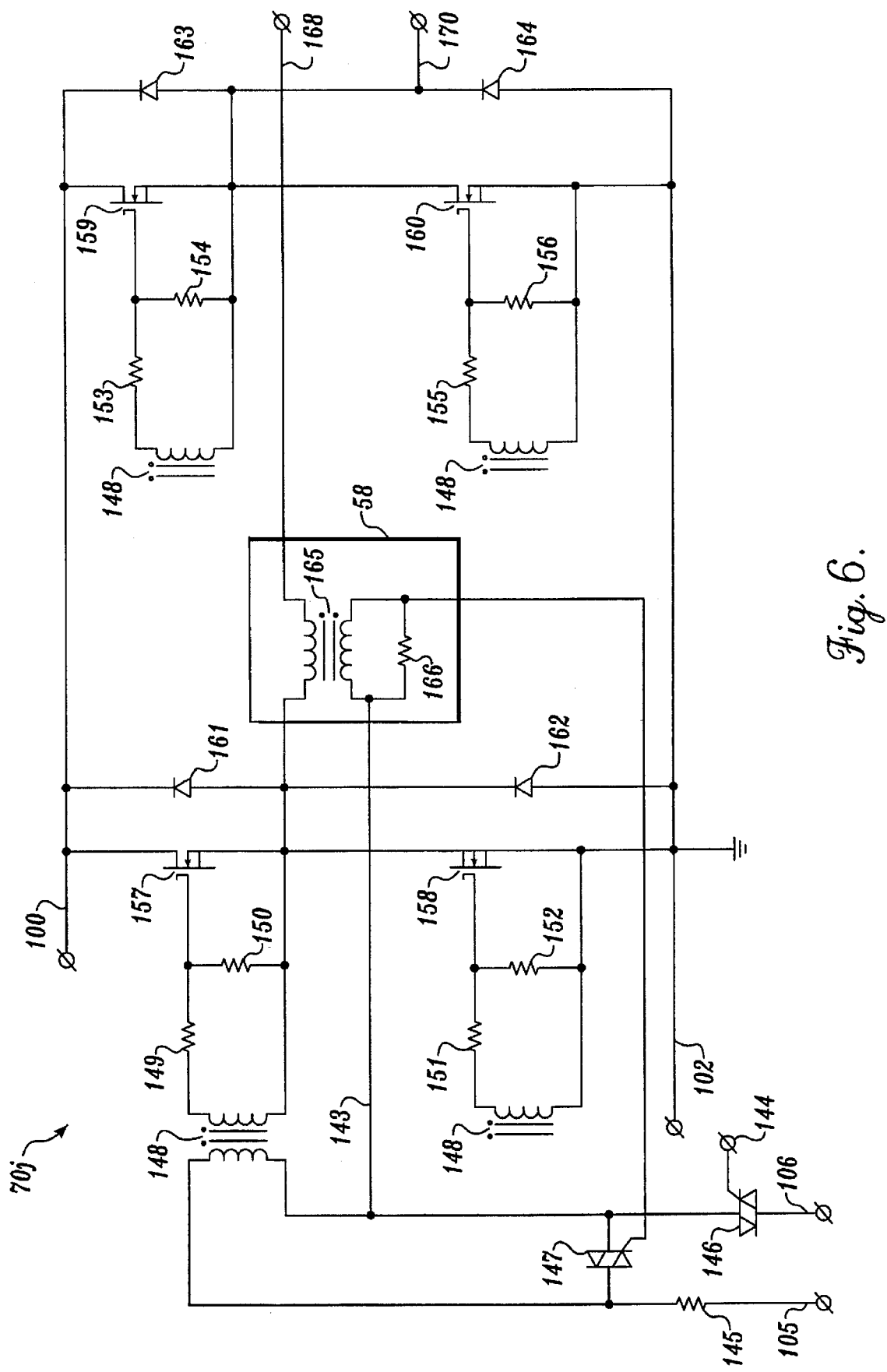
FIG. 6 is a circuit diagram of an inverter suitable for use in a high voltage generator contained within the power supply of FIG. 2.

The Group III high voltage generator is designed to produce a periodic variable-width rectangular pulse that is used as an accelerator voltage during the driving mode of the power supply. In the arrangement of FIG. 2, the Group III generator includes a single high voltage generator 50j. The unregulated DC voltage from the AC-to-DC rectifier 52 is directly coupled via lines 100 and 102 to high voltage generator 50j. FIG. 6 is a circuit diagram of a pulsewidth-modulated (PWM) inverter suitable for use in high voltage generator 50j. The PWM inverter 70j is shown schematically as comprising the following primary elements: transformer 148, four power metal-oxide-semiconductor field-effect transistors (MOSFETs) 157, 158, 159, and 160, current transformer 165, resistor 166, and triacs 146 and 147. Transistors 157, 158, 159, and 160 are connected in a full-bridge configuration. When one transistor pair, for example transistors 157 and 160, are biased ON (i.e., conducting), the other transistor pair comprising transistors 158 and 159 are switched OFF, allowing current to flow from line 100 through transistor 157 and transformer 165 to terminal 168. Terminals 168 and 170 are connected to the primary winding 74j of the high voltage transformer 72j. The current flows from terminal 168, through the primary winding of the high voltage transformer, and through terminal 170 and transistor 160 to ground. When transistors 157 and 160 are switched OFF, and transistors 158 and 159 are biased ON, the current flows through the primary winding 74j in the opposite direction. That is, current flows from line 100 through transistor 159, terminal 170, primary winding 74j, terminal 168, and transistor 158 to ground. Alternately biasing or switching each transistor pair ON or OFF therefore causes current to flow in the primary winding of high voltage transformer 72j in one direction or the other.

The switching of the MOSFET pairs is controlled by the timing signal generated by timing generator 66 and connected to the inverter at terminals 105 and 106. In a preferred mode of operation, the square wave timing signal generated by the timing generator has a frequency of 10 to 20 kHz and a magnitude of 15 volts. Terminals 105 and 106 are connected to the primary winding of transformer 148. Applying a square wave voltage to transformer 148 biases the transistor pairs ON and OFF. When terminal 105 is of a positive polarity with respect to terminal 106, a positive voltage is applied to the gates of transistors 157 and 160, biasing the transistors ON. At the same time, a negative voltage is applied to the gates of the transistors 158 and 159 due to the reverse polarity of the secondary winding of transformer 148 connected to those transistors. While transistors 157 and 160 are biased ON, transistors 158 and 159 will therefore be switched OFF. Similarly, when voltage across the terminals 106 and 105 reverses its polarity so that terminal 106 is positive with respect to terminal 105, transistors 157 and 160 are switched OFF and transistors 158 and 159 are biased ON.

Additional components are present in the inverter to optimize the inverter operation. Diodes 161, 162, 163, and 164 are coupled between terminals 168 and 170 and lines 100 and 102 to allow current to flow from high voltage transformer 72j to lines 100 and 102 when all four transistors are switched OFF. The transistors are switched OFF during shut down, or when no voltage is generated by the high voltage generator. Resistors 149, 151, 153, and 155 are connected between the secondary winding of transformer 148 and the gates of the transistors in order to limit the gate voltage applied of the transistors. Resistors 150, 152, 154 and 156 are connected between the gate and the source of transistors 157, 158, 159 and 160. The resistors create a path for current flowing from the gate-to-source capacitance of the transistors to allow the transistors to switch to an OFF position more quickly.

Each inverter may be enabled or disabled by an appropriate control signal applied to a terminal 144. Terminal 144 is connected to the gate of a triac 146, which is in series with the primary winding of transformer 148. When triac 146 is biased ON by applying a voltage at terminal-144, the connection between terminal 106 and transformer 148 is completed, allowing the square wave voltage from the timing generator to be applied to the gates of transistors 157, 158, 159, and 160. When the triac 146 is switched OFF, however, the connection between terminal 106 and transformer 148 is broken and transistors 157, 158, 159, and 160 remain switched OFF. When triac 146 is switched OFF, no output voltage is therefore generated by the PWM inverter. In a preferred embodiment of the invention, triac 146 remains biased ON in inverter 70j to ensure that the Group III high voltage generator is always enabled.

A circuit comprising a current transformer 165, a resistor 166, and a triac 147 serves as overcurrent protection for the PWM inverter. The primary winding of current transformer 165 is connected in series with the output line connected to terminal 168 and the primary winding of high voltage transformer 74j. A resistor 166 is connected in parallel with the secondary winding of current transformer 165. The secondary winding is also coupled between the primary winding of transformer 148, and the gate of triac 147. Triac 147 is connected between terminals 105 and 106. Since resistor 166 is connected across the secondary winding of current transformer 165, a voltage drop is generated across resistor 166 that is proportional to the output current of the inverter. A value is selected for resistor 166 so that when the output current magnitude reaches a preselected limit, the voltage drop across resistor 166 is sufficient to bias triac 147 in the ON position. When triac 147 is biased ON, terminal 106 is shorted across a resistor 145 to terminal 105, preventing the square wave voltage generated by the timing generator from being applied across transformer 148. When the current in the inverter passes the overcurrent limit, the inverter is therefore disabled by the triac shorting terminal 105 to terminal 106.

For the Group III high voltage generator, the circuit comprising current transformer 165, resistor 166, and triac 167 also serves as the current monitor 58 to control the width of the rectangular voltage pulse produced by high voltage generator 50j. Resistor 166 in the Group III inverter 70j is selected to have a value that is greater than the value of resistor 166 used in PWM inverters 70a, 70b, . . . 70i. The value of resistor 166 is selected so that when the output current from the inverter exceeds a target current, a sufficient voltage drop is generated across resistor 166 to bias triac 147 ON. The target current is the current through the inverter that indicates that the current in the load is equal to or greater than the desired current $I_d$. Biasing triac 147 ON will cause inverter 70j to be switched off, turning off the output voltage from the Group III generator. The Group III inverter 70j therefore produces rectangular voltage pulses rather than the square wave voltage produced by inverters 70a, 70b, . . . 70i.

With reference to FIG. 2, the rectangular voltage pulses produced by inverter 70j are applied to high voltage transformer 72j. The high voltage transformer steps-up the input voltage to a desired output level. In a preferred embodiment of the high voltage power supply, the high voltage transformer has a ferrite core, with a primary winding 74j having 90 turns and a secondary winding 76j having 550 turns. The alternating square wave voltage driving inverter 70j has a frequency of 10 to 20 kHz. After being stepped-up by the high voltage transformer, the Group III high voltage generator therefore produces an output voltage having the same frequency of 10 to 20 kHz and a magnitude of about 1,000 volts.

Figure 7:
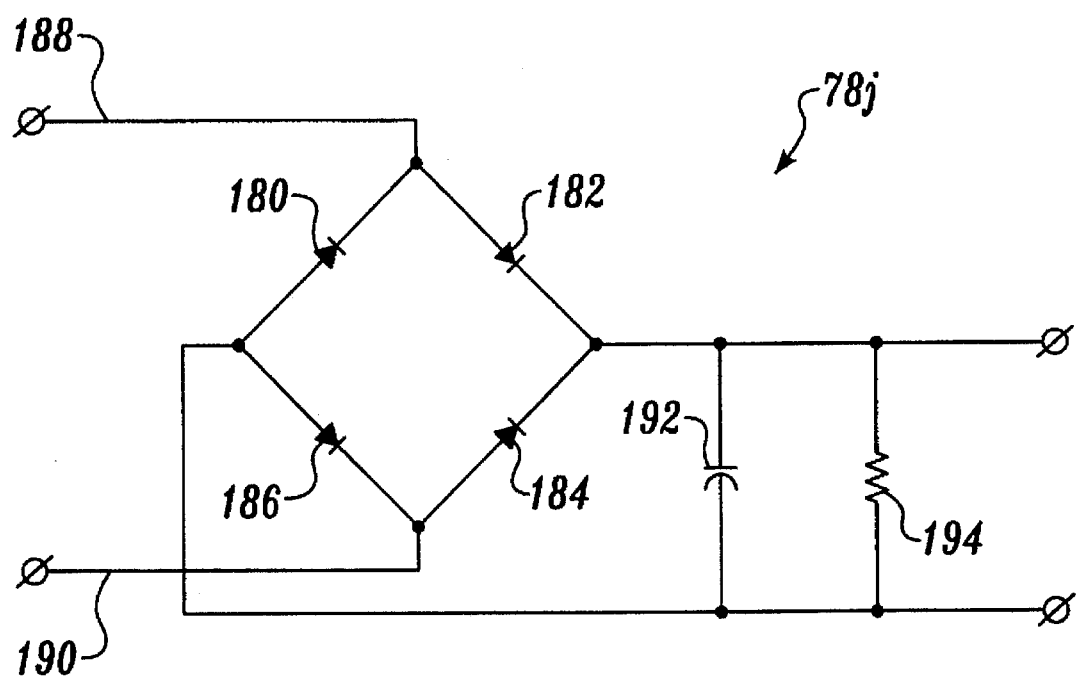
FIG. 7 is a circuit diagram of a high voltage rectifier suitable for use in a high voltage generator contained within the power supply of FIG. 2.

After the inverter output voltage is stepped-up by transformer 72j, it is applied across high voltage rectifier 78j. FIG. 7 is a circuit diagram of an exemplary high voltage rectifier 78j suitable for use in high voltage generator 50j. The high voltage rectifier comprises four high voltage diodes 180, 182, 184, and 186 that are connected in a full-bridge configuration. Input lines 188 and 190 of the bridge are connected to the secondary winding 76j of high voltage transformer 72j. The output lines from the bridge are connected across a ;parallel combination of a capacitor 192 and a resistor 194. In operation, a high voltage square pulse generated by inverter 70j and stepped-up by transformer 72j is applied across the input to the diode bridge. The full-wave rectified output from the bridge is then filtered and loaded by capacitor 192 and resistor 194. The rectified output from the Group III high voltage generator corresponds to the $V_3$ graph as shown in FIGS. 4 and 5.

3. Group II High Voltage Generators

With reference to FIG. 2, in a preferred embodiment the eight Group II high voltage generators 50b, 50c, . . . 50i are constructed using a design nearly identical to the Group III high voltage generator 50j. Inverters 70b, 70c, . . . 70i are constructed substantially as shown in FIG. 6. A slight variation is that the value of resistor 166 is selected so that the Group II inverters will not be disabled when the desired current is indicated in the load. The value of resistor 166 is instead selected to provide overcurrent protection for each high voltage generator. As a result, in normal operation the Group II inverters 70b, 70c, . . . 70i produce an output voltage that is substantially identical to the square wave voltage produced by the timing generator. That is, the inverters are driven at the 10 kHz to 20 kHz frequency of the timing square wave, and produce a square wave output voltage at this frequency. The remaining components in each high voltage generator 50b, 50c, . . . 50i are identical to the components in high voltage generator 50j. High voltage transformers 72b, 72c, . . . 72i are identical to transformer 72j, and rectifiers 78b, 78c, . . . 78i correspond to the construction of rectifier 78j as shown in FIG. 7. The square wave generated by the inverter is stepped-up by the transformer and full wave rectified by the rectifier. Each Group II high voltage generator therefore produces an approximately DC output voltage having an amplitude of 1,000 volts.

Figure 8:
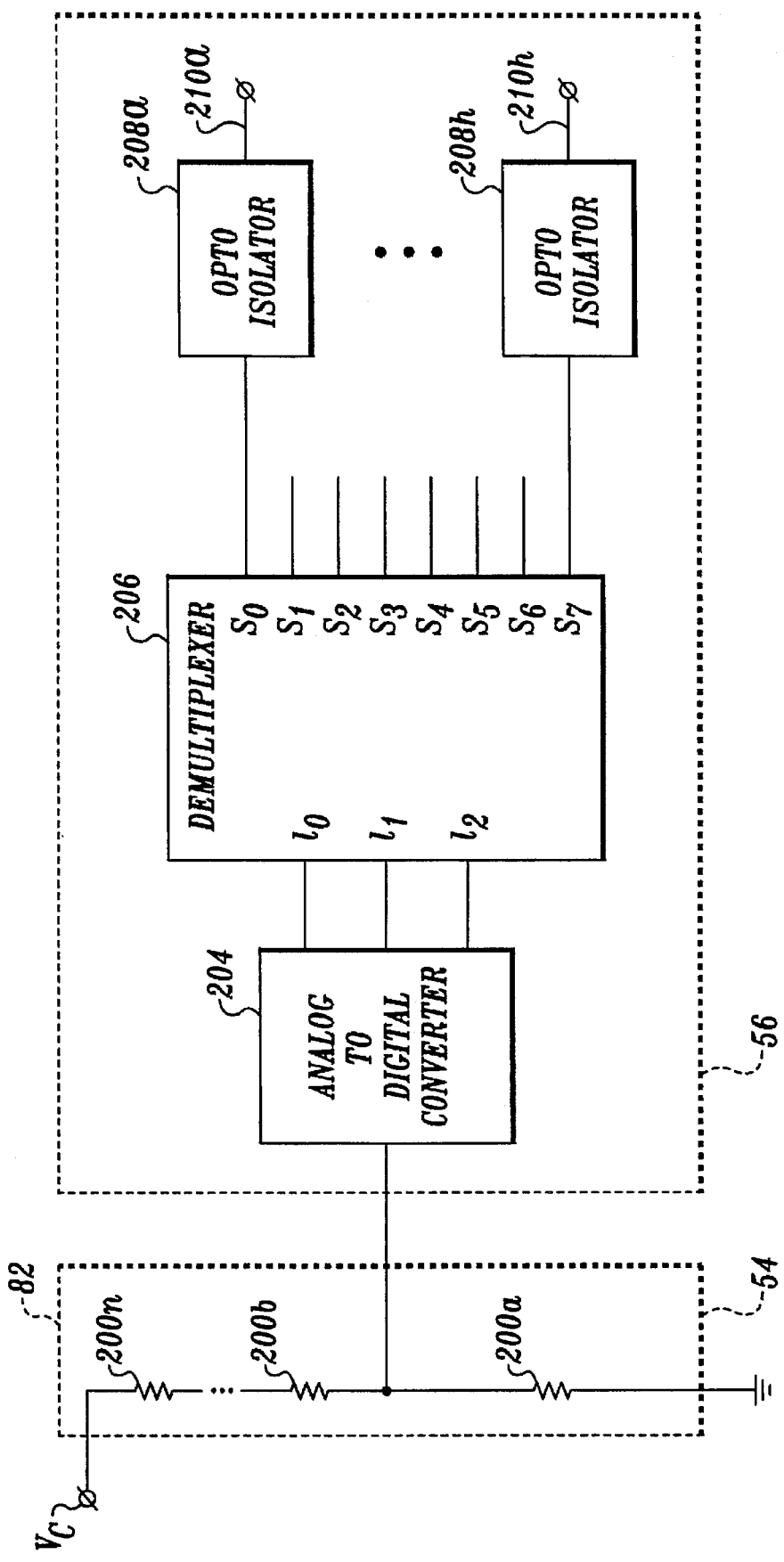
FIG. 8 is a circuit diagram of a control circuit suitable for enabling or disabling a plurality of high voltage generators in the high voltage power supply of FIG. 2.
Figure 9:
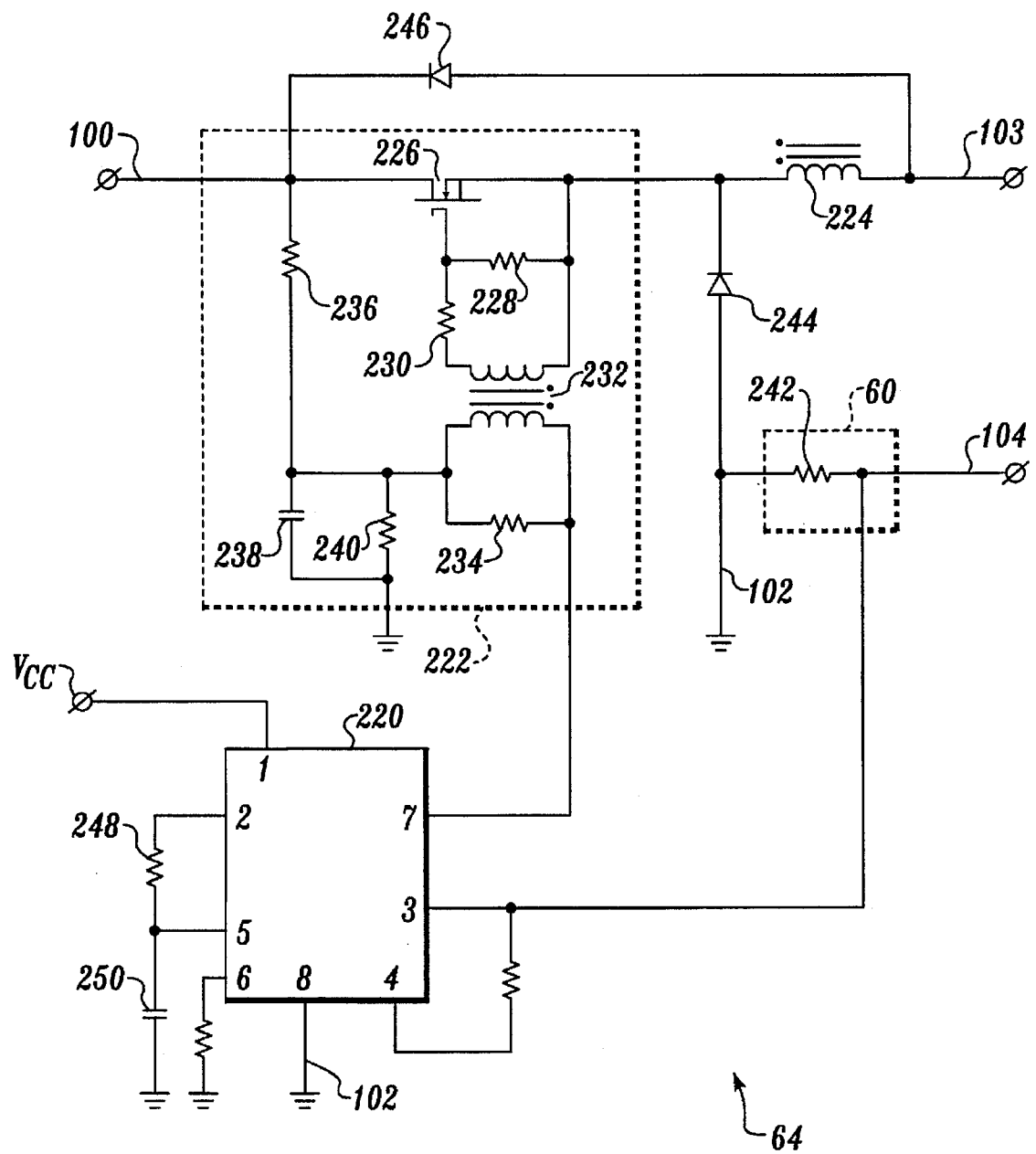
FIG. 9 is a circuit diagram of a current control circuit suitable for maintaining a constant current in a high voltage generator in the high voltage power supply of FIG. 2.

Control circuit 56 is connected to each of the Group II high voltage generators 50b, 50c, . . . 50i. The control circuit is designed to monitor the voltage $V_c$ across the capacitive component of the load and to enable or disable the Group II high voltage generators so that the output voltage $V_2$ from the Group II generators is less than or equal to $V_c$. FIG. 8 is a block diagram of a control circuit suitable for monitoring the voltage drop across the capacitive, component of the load and enabling or disabling additional Group II high voltage generators in the high voltage power supply.

As shown in FIG. 8, high voltage divider network 82 consists of resistors 200a, 200b, . . . 200n connected in series between $V_c$ and ground. The resistors are selected such that the voltage drop across resistors 200b, 200c, . . . 200n reduces the voltage drop across resistor 200a to a desired level. The voltage across resistor 200a is provided on line 54 to control circuit 56.

Control circuit 56 includes an analog-to-digital converter 204, a demultiplexer 206, and, in a preferred embodiment of the invention, eight optoisolators 208a, 208b, . . . 208h. The analog-to-digital converter 204 is connected to the high voltage divider network by line 54. Converter 204 measures the voltage across resistor 200a and generates a three-bit digital value that is representative of the voltage $V_c$ across the capacitive components of the load. It will be appreciated that resistors 200a, 200b, . . . 200n should be selected such that the expected voltage variation across resistor 200a is within the input voltage range of analog-to-digital converter 204.

The digitized value corresponding to voltage $V_c$ is input into demultiplexer 206. In a preferred embodiment of the invention, demultiplexer 206 is a 3×8 decoder that enables the output lines that correspond to the digital value received on the demultiplexer input lines. Each output line from the demultiplexer is coupled to an optoisolator 208a, 208b, . . . 208h. The optoisolators are then coupled via lines 210a, 210b, . . . 210h to terminal 144 and the gate of triac 146 contained in each Group II inverter as shown in FIG. 6. Optoisolators 208a, 208b, . . . 208h are provided between demultiplexer 206 and high voltage generators 50b, 50c, . . . 50i to ensure that the high voltage produced in the high voltage generators is isolated from the logic circuitry in control circuit 56.

As the high voltage power supply generates and applies a high voltage to a load, a voltage across resistor 200a (and corresponding to the voltage $V_c$ across the capacitive component of the load) is provided to control circuit 56. Based on the voltage $V_c$, the demultiplexer will enable or disable the inverters in the Group II high voltage generators in order to ensure that the sum voltage generated by the Group II generators is equal to or less than the voltage $V_c$. If $V_c$ increases, the control circuit will enable additional Group II high voltage generators by generating additional signals on lines 210a, 210b, . . . 210h to bias ON triac 146 and the associated inverters 70b, 70c, . . . 70i. If $V_c$ decreases, the control circuit will disable additional Group II high voltage generators by switching OFF one or more of the triacs in the high voltage generator inverters. Ideally, the sum voltage produced by the Group II generators should not fail below the voltage $V_c$ by an amount greater than the maximum voltage that can be produced by the Group I generators (i.e., $V_{c-V2} < V_1$). This ensures that the sum of the Group I and II generators will allow the output voltage $V_{gen}$ of the high voltage power supply to accurately track $V_c$. The sum of the output voltages from the Group II high voltage generators corresponds to the $V_2$ graph shown in FIGS. 4 and 5.

4. Group I High Voltage Generator

With reference to FIG. 2, in a preferred embodiment the Group I high voltage generator 50a is constructed using a design nearly identical to the Group III high voltage generator 50j. Inverter 70a is constructed as shown in FIG. 6. The only variation in inverter construction is that the value of resistor 166 is selected to provide overcurrent protection, rather than to set a desired current in the load. High voltage transformer 70a is constructed around a magnetic ferrite core, with a primary winding consisting of 90 turns and a secondary winding consisting of 640 turns. The additional turns in the secondary winding of high voltage transformer 70a increases the output voltage produced by the Group I high voltage generator to about 1,200 volts. Rectifier 78a corresponds to the construction of rectifier 78j as shown in FIG. 7.

The Group I high voltage generator is designed to produce an output voltage ranging between zero and a maximum value in order to track the difference in the voltage generated by the Group II high voltage generators and the voltage $V_c$ across the capacitive components in the load. During the driving mode, the Group I high voltage generator produces a dynamically-varying high voltage. During the tracking mode, the Group I high voltage generator produces a voltage such that $V_1 + V_2 = V_c$.

To ensure that the high voltage generator 50a produces a desired output voltage, current control circuit 64 is provided to monitor and maintain a desired current through the high voltage generator. A schematic diagram of a current control circuit suitable for monitoring and maintaining a desired current through the Group I high voltage generator is provided in FIG. 9. The heart of the current control circuit is a PWM controller 220, which in a preferred embodiment of the invention is a Signetics NE5561. PWM controller 220 generates an internal sawtooth waveform voltage having a preferred frequency of 40 kHz for an inverter embodiment operating from a 20 kHz timing signal. The PWM controller frequency is determined by a resistor 248 and a capacitor 250 connected to the controller.

The PWM controller 220 is connected to a switching network 222 that is used to connect and disconnect the DC voltage provided on line 100 with the inverter 70a through an inductor 224. Switching network 222 comprises a MOSFET transistor 226, having the drain electrode connected with line 100, and the base and source electrodes connected with inductor 224. The gate electrode of transistor 226 is connected to one lead of the secondary winding of a transformer 232 through a resistor 230. The other lead of the secondary winding is connected to the base and source electrodes of the transistor, and also to the gate electrode through a resistor 228. Resistor 230 limits the current applied to the gate of transistor 226, and resistor 228 creates a path for current flowing from the gate-to-source capacitance of the transistor to allow the transistor to switch to an OFF position more quickly. One lead of the primary winding of transformer 232 is connected across a resistor 240 and capacitor 238 to ground, and through a resistor 236 to line 100. A resistor 234 is connected in parallel with the primary winding. The other lead of the primary winding is connected to the PWM controller 220.

In operation, transistor 226 is switched by PWM controller 220 to achieve discontinuous current flow through inductor 224 and inverter 70a. When PWM controller is switched on, current is allowed to flow from line 100 through resistor 236 and the primary winding of transformer 232 and to ground via the PWM controller on line 102. This generates a positive voltage across the gate of transistor 226, biasing the transistor ON and allowing current to flow through inductor 224 and over line 103 to inverter 70a. After flowing through inverter 70a, the current flows through a line 104, a shunt resistor 242, and on line 102 to ground. As the magnitude of the current increases through the shunt resistor, the voltage drop across the resistor increases. When the current reaches a desired level, the voltage drop is sufficient to turn the PWM controller off. On turning the PWM controller off, transistor 236 is switched OFF and switching network 222 no longer allows current to flow to the inverter. Shunt resistor 242 therefore operates as current monitor 60 to control the output voltage of the Group I high voltage generator.

When the switching network halts current flow on line 100, current flow in the secondary winding of high voltage transformer 72a and energy stored in the inductor 224 induces a current flow through shunt resistor 242 and a diode 244. If the current flow through the shunt resistor indicates a current level flowing through the load above the desired current level, then the voltage drop across the shunt resistor is sufficient to maintain the PWM controller 220 in an off state. When the current flow through the shunt resistor indicates a current level in the load below the desired current level, then the voltage across shunt resistor 242 falls below the necessary voltage to maintain the PWM control in the off position. Appropriate selection of the shunt resistor therefore selects the desired current $I_d$ that is to be maintained in the load. It will be appreciated that PWM controller adjusts the output voltage produced by high voltage generator 50a in order to maintain a desired current though the high voltage power supply and the load. The output voltage of the inverter is determined by the difference between $V_c$ and $V_2$.

A diode 246 is also provided in the current control circuit to protect the circuit from overvoltage. Those skilled in the art will recognize that other circuits or techniques may be used to maintain a desired current level from the output of high voltage generator 50a. The output from the Group I high voltage generator corresponds to the $V_1$ graph as shown in FIG. 4 and 5.

Having described the construction of the high voltage power supply, a brief example of the performance of the preferred embodiment of the power supply is provided below. For purposes of the example, a representative load is selected that has a resistive component of 20 kOhm, a capacitive component of 10 uF, and a inductive component of $6 \times 10^{-3}$ H. Each high, voltage generator 50a, 50b, ... 50j produces an output voltage of approximately 1,000 volts, thereby producing a potential maximum output voltage for the high voltage power supply of 10 kV. Timing generator 66 produces a square wave tinting signal of approximately 15 kHz, having a period of 66×10.6 seconds.

During the driving mode of the high voltage power supply, the sum of the Group I, II, and III generators produces a voltage that exceeds the voltage across the capacitive component of the load by approximately 1,000 volts. From equation (1), the rate of change of the current in the load is:

$$\frac{di}{dt} = \frac{1000}{6 \times 10^3}$$

For the current in the load to initially drop during the driving mode and then reach a desired value of 0.5 amps therefore takes approximately $6 \times 10^{-6}$ seconds. Once the current in the load has reached the desired value, the high voltage power supply enters the tracking mode. The Group II high voltage generators continue to generate an output voltage that is less than or equal to the voltage across the capacitive component of the load. The Group I high voltage generator generates the difference between the Group II output voltage and the voltage across the capacitive component of the load. During the tracking mode, the current in the load remains constant since there is no voltage drop across the inductive component of the load.

It will be appreciated that a high voltage power supply formed in accordance with the present invention offers many advantages over the prior art. Because few energy storage elements are used to maintain the output voltage level at a desired value, the high voltage power supply of the present invention may be quickly switched on or off. The lack of energy storage elements also provides for a fast response time to variations in load voltage. The high voltage power supply of the present invention is therefore suitable for use in dynamic applications wherein the load has quickly varying capacitive, resistive, and inductive components.

A further advantage is that the use of multiple high voltage generators to generate a desired output voltage allows the high voltage power supply to be tailored for each particular application. High voltage generators may be added to the Group II generators to increase maximum generated voltage and produce a greater dynamic range of the power supply. Control circuit 56 can similarly be expanded or reduced to control a greater or lesser number of high voltage generators.

While the preferred embodiment of the invention has been illustrated and described, it will be appreciated that various changes can be made therein without departing from the spirit and scope of the invention. For example, while the preferred embodiment of the power supply contains only one high voltage generator in Groups I and III, those skilled in the art will recognize that in each group a number of high voltage generators could be connected in cascode fashion to create the desired output voltage. Similarly, although the preferred embodiment of the high voltage power supply has eight high voltage generators in Group II, the number of generators may be varied depending upon the expected load and load fluctuation.

It will also be appreciated that the construction of the high voltage transformers contained within each high voltage generator may be varied. Instead of having a single secondary winding in each high voltage transformer, the transformers may be constructed with a plurality of secondary windings. Each of the plurality of secondary windings may be coupled to a high voltage rectifier, and the output voltage of each high voltage rectifier summed to produce the output voltage of the high voltage generator.

Those skilled in the art will recognize that while current control circuit 64 is used to ensure that the output voltage of Group I tracks the voltage across the capacitive component in the load, other control methods could be used to control the Group I output voltage. For example, a dedicated circuit could be used to monitor voltage $V_c$ and change the output voltage $V_1$ of Group I to ensure the sum of $V_1$ and $V_2$ tracks $V_c$. Those skilled in the art will recognize that this implementation would require additional circuitry to accurately monitor the voltage across the capacitive component of the load and to quickly modify $V_1$ in response to changes in $V_c$.

It will further be recognized that while the voltage $V_c$ across the capacitive component of the load was used as feedback in the preferred embodiment of the high voltage power supply, other measures of the voltage or current in the load could be used as feedback to control the number of Group II generators that are enabled or disabled. For example, a measure of the rate of charge or discharge of the capacitor in the load may be used as an indication of the current flowing in the load. Alternatively, a direct measurement may be made of the current magnitude or direction in the load. The actual parameter used to monitor the current in the load may depend on the availability and accessibility of the parameter in the load.

While the preferred embodiment of the high voltage power supply is discussed above, other well-known parts, components, and their combinations may be employed in this circuit for generating a PWM square waveform voltage to maintain a desired output current. Several different designs of equivalent function and performance are available to replace the component blocks of the high voltage power supply in FIG. 2. Consequently, within the scope of the appended claims it will be appreciated that the invention can be practiced otherwise than as specifically described herein.

The embodiments of the invention in which an exclusive property or privilege is claimed are defined as follows:

1. A high voltage power supply for generating a controlled current in a load having component parts, comprising:

(a) a timing generator producing a repetitive timing signal, wherein during each repetition of the timing signal the power supply cycles through a driving mode and a tracking mode;

(b) a first voltage generator connected to the timing generator and producing a tracking voltage during the tracking mode;

(c) a second voltage generator and the timing generator and coupled in cascode with the first voltage generator, the second voltage generator producing a base voltage during the driving mode and the tracking mode; and (d) a third voltage generator connected to the timing generator and coupled in cascode with the first and second voltage generators, the third voltage generator producing an accelerator voltage during the driving mode, wherein an output voltage produced by the power supply is equal to the sum of the tracking voltage, the base voltage, and the accelerator voltage produced by the first voltage generator, the second voltage generator, and the third voltage generator so that during the driving mode the output voltage from the power supply induces an increasing voltage in the lead to raise the current in the load to a desired level, and during the tracking mode the output voltage from the power supply maintains the current in the load at substantially the desired level.

2. The power supply of claim 1, wherein the second voltage generator comprises a plurality of high voltage generators coupled in cascode with one another.

3. The power supply of claim 2, further comprising a control circuit coupled to the plurality of high voltage generators and to the load, said control circuit monitoring a voltage across a component part of the load and enabling or disabling a desired number of the plurality of high voltage generators in response to changes in the voltage across the component part of the load.

4. The power supply of claim 3, wherein the control circuit maintains the base voltage produced by the plurality of high voltage generators at a level less than or equal to the voltage monitored by the control circuit.

5. The power supply of claim 4, further comprising a DC power source connected to supply operating power to the power supply.

6. The power supply of claim 5, wherein each of the plurality of high voltage generators comprises:
  (a) an inverter having a first input coupled to the DC power source and a second input coupled to the timing generator;
  (b) a transformer having a primary winding coupled to an output from the inverter; and
  (c) a rectifier coupled to a secondary winding of the transformer.

7. The power supply of claim 6, wherein each of the plurality of high voltage generators generates a rectified square wave output voltage in synchronism with the timing signal generated by the timing generator.

8. The power supply of claim 2, wherein each of the plurality of high voltage generators generates an output voltage having the same magnitude.

9. The power supply of claim 2, wherein some of the plurality of high voltage generators generate an output voltage having the same magnitude and the remainder of the plurality of high voltage generators generate an output voltage having a different magnitude.

10. The power supply of claim 1, wherein the repetitive timing signal is non-periodic.

11. The power supply of claim 1, further comprising a DC power source connected to supply operating power to the power supply.

12. The power supply of claim 11, wherein the third voltage generator comprises:
  (a) an inverter having a first input coupled to the DC power source and a second input coupled to the timing generator;
  (b) a transformer having a primary winding coupled to an output from the inverter;
  (c) a rectifier coupled to a secondary winding of the transformer; and
  (d) a feedback circuit coupled to the inverter, the feedback circuit monitoring a current in the power supply and disabling the third voltage generator if a desired current level is achieved.

13. The power supply of claim 12, wherein the third voltage generator produces a periodic square pulse.

14. The power supply of claim 11, further comprising a current control circuit coupled between the DC power source and the first voltage generator.

15. The power supply of claim 14, wherein the first voltage generator comprises:
  (a) an inverter having a first input coupled to the current control circuit and a second input coupled to the timing generator, the current control circuit maintaining a current in the inverter at a desired level;
  (b) a transformer having a primary winding coupled to an output from the inverter; and
  (c) a rectifier coupled to a secondary winding of the transformer.

16. The power supply of claim 15, wherein the first voltage generator produces a tracking voltage equivalent to a voltage across a component of the load minus the base voltage produced by the second voltage generator.

17. The power supply of claim 1, wherein the repetitive timing signal is a periodic bi-polar signal.

18. The power supply of claim 1, wherein the first voltage generator comprises a plurality of high voltage generators coupled in cascode to produce the tracking voltage.

19. The power supply of claim 1, wherein the third voltage generator comprises a plurality of high voltage generators coupled in cascode to produce the accelerator voltage.

20. A high voltage power supply for generating a controlled current in a lead having varying inductive, capacitive, and resistive components, comprising:
  (a) a DC power source;
  (b) a timing generator producing a repetitive timing signal, wherein during each repetition of the timing signal the power supply cycles through a driving mode sod a tracking mode; and
  (c) a plurality of high voltage generators coupled in cascode to the lead such that the output voltages produced by the plurality of high voltage generators are summed with one another, wherein during the driving mode of operation the high voltage generators produce an output voltage exceeding a voltage across the capacitive component of the lead, thereby causing an increasing current in the load until the current reaches a desired level, after which the high voltage generators enter the tracking mode of operation wherein the high voltage generators produce an output voltage substantially equal to the voltage across the capacitive component of the load, thereby causing a current in the load to remain at the desired level, each of the plurality of high voltage generators comprising:
    (i) an inverter having an input connected to said DC power source and an input coupled to said timing generator and producing an AC voltage in synchronism with the timing signal;
    (ii) a transformer coupled to the inverter for stepping up the AC voltage produced by the inverter; and
    (iii) a rectifier coupled to the inverter for rectifying the AC voltage produced by the inverter.

21. A high voltage power supply for generating a controlled current in a load having a capacitive component, comprising:
  (a) a timing circuit generating a periodic bi-polar timing signal; and
  (b) a voltage generator for generating a voltage during each polarity of the periodic bi-polar timing signal, the voltage generator comprising:
    (i) a first generator coupled to the load and to the timing circuit, the first generator generating and applying to the load a driving voltage synchronously with each transition of the periodic bi-polar timing signal, wherein the driving voltage induces an increasing current in the load, the driving voltage being applied until the current in the load reaches a desired magnitude; and (ii) a second generator coupled to the load and to the timing circuit, the second generator generating and applying to the load a tracking voltage following the generation of the driving voltage by the first generator, wherein the tracking voltage is equal to a voltage measured across the capacitive component of the load so that the current in the load is maintained at a nearly constant level.

22. The high voltage power supply of claim 21, wherein the first generator comprises:

(a) an accelerator generator for generating a periodic rectified rectangular pulse as an output voltage; and (b) a base generator coupled in cascode with the accelerator generator for generating a periodic rectified square wave as an output voltage, wherein the sum of the output voltage from the accelerator generator and the output voltage from the base generator exceed a voltage in the load and therefore generate an increasing current in the load.

23. The high voltage power supply of claim 21, wherein the second generator comprises:

(a) a base generator for generating a periodic rectified square wave as an output voltage, the periodic rectified square wave having an amplitude less than or equal to a voltage measured across the load; and (b) a tracking generator coupled in cascode with the base generator for generating a voltage equivalent to the difference between the output voltage produced by the base generator and the voltage measured across the load, wherein the sum of the output voltage produced by the base generator and the output voltage produced by the tracking generator is equal to the voltage across the load.

* * * * *

UNITED STATES PATENT AND TRADEMARK OFFICE
CERTIFICATE OF CORRECTION

PATENT NO.   :   5,629,844
DATED        :   May 13, 1997
INVENTOR(S)  :   I.A. Krichtafovitch et al.

It is certified that error appears in the above-indentified patent and that said Letters Patent is hereby corrected as shown below:

| COLUMN | LINE | |
|---|---|---|
| 16 (Claim 1, | 49 line 6) | After "tracking mode" delete ":" and insert --;-- |
| 16 (Claim 1, | 53 line 10) | "generator and the" should read --generator connected to the-- |
| 17 (Claim 1, | 2 line 25) | "lead" should read --load-- |
| 18 (Claim 20, | 25 line 2) | "lead" should read --load-- |
| 18 (Claim 20, | 31 line 8) | "sod" should read --and-- |
| 18 (Claim 20, | 33 line 10) | "lead" should read --load-- |

UNITED STATES PATENT AND TRADEMARK OFFICE
CERTIFICATE OF CORRECTION

PATENT NO. : 5,629,844
DATED : May 13, 1997
INVENTOR(S) : I.A. Krichtafovitch et al.

It is certified that error appears in the above-indentified patent and that said Letters Patent is hereby corrected as shown below:

COLUMN  LINE

18  38  "lead," should read --load,--
(Claim 20,  line 15)

Signed and Sealed this

Second Day of September, 1997

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,629,844
DATED : May 13, 1997
INVENTOR(S) : I.A. Krichtafovitch et al.

It is certified that error appears in the above-indentified patent and that said Letters Patent is hereby corrected as shown below:

| COLUMN | LINE | |
|---|---|---|
| 2 | 16 | After "switching" delete ";" |
| 2 | 59 | "and Group II" should read --and Group III-- |
| 3 | 52 | After "makes it" delete "a" |
| 5 | 46 | "50a, 50b, 50j" should read --50a, 50b, . . . 50j-- |
| 7 | 14 | "mount" should read --amount-- |
| 9 | 57 | Before "pair" delete ":" |
| 10 | 47 | "terminal-144," should read --terminal 144,-- |
| 11 | 55 | Before "parallel" delete ";" |
| 12 | 30 | After "capacitive" delete "," |
| 13 | 14 | "fail" should read --fall-- |
| 13 | 17 | "$V_c-V_2<V_1)$." should read --$V_c-V_2 \leq V_1)$.-- |
| 14 | 32 | "transistor 236" should read --transistor 226-- |
| 14 | 62 | "FIG. 4 and 5." should read --FIGS. 4 and 5.-- |

UNITED STATES PATENT AND TRADEMARK OFFICE
CERTIFICATE OF CORRECTION

PATENT NO. : 5,629,844
DATED : May 13, 1997
INVENTOR(S) : I.A. Krichtafovitch et al.

It is certified that error appears in the above-indentified patent and that said Letters Patent is hereby corrected as shown below:

| COLUMN | LINE | |
|---|---|---|
| 15 | 2 | After "high" delete "," |
| 15 | 6 | "tinting" should read --timing-- |
| 15 | 7 | "66 x 10.6" should read --66 x $10^{-6}$-- |
| 15 | 16 | "$\frac{di}{dt} = \frac{1000}{6 \times 10^3}$" should read --$\frac{di}{dt} = \frac{1000}{6 \times 10^{-3}}$-- |
| 16 (Claim 1, | 49 line 6) | After "tracking mode" delete ":" and insert --;-- |
| 16 (Claim 1, | 53 line 10) | "generator and the" should read --generator connected to the-- |
| 17 (Claim 1, | 2 line 25) | "lead" should read --load-- |
| 18 (Claim 20, | 25 line 2) | "lead" should read --load-- |
| 18 (Claim 20, | 31 line 8) | "sod" should read --and-- |

UNITED STATES PATENT AND TRADEMARK OFFICE
CERTIFICATE OF CORRECTION

PATENT NO. : 5,629,844

DATED : May 13, 1997

INVENTOR(S) : I.A. Krichtafovitch et al.

It is certified that error appears in the above-identified patent and that said Letters Patent is hereby corrected as shown below:

| COLUMN | LINE | |
|---|---|---|
| 18 (Claim 20, | 38 line 15) | "lead," should read --load,-- |
| 18 (Claim 20, | 33 line 10) | "lead" should read --load-- |

Signed and Sealed this

Twenty-fifth Day of November, 1997

Attest:

BRUCE LEHMAN

Attesting Officer     Commissioner of Patents and Trademarks